United States Patent [19]
Shah

[11] Patent Number: 6,127,591
[45] Date of Patent: Oct. 3, 2000

[54] METHOD OF DIGESTING AN EXPLOSIVE NITRO COMPOUND

[75] Inventor: Manish M. Shah, Richland, Wash.

[73] Assignee: Battelle Memorial Institute, Richland, Wash.

[21] Appl. No.: 09/203,792

[22] Filed: Nov. 30, 1998

[51] Int. Cl.$^7$ ...................................................... A62D 3/00
[52] U.S. Cl. ......................... 588/200; 588/202; 588/203; 588/204; 588/205; 588/215; 588/218; 588/238; 588/242; 588/244; 588/246
[58] Field of Search ........................ 422/186.3; 588/203, 588/202, 204, 200, 205, 215, 218, 238, 242, 244, 246; 149/105

[56] References Cited

U.S. PATENT DOCUMENTS

| | | | |
|---|---|---|---|
| 5,250,161 | 10/1993 | Chin et al. ............................... | 204/131 |
| 5,370,845 | 12/1994 | Miller et al. .......................... | 422/186.3 |
| 5,458,743 | 10/1995 | Allen ...................................... | 204/1.11 |

Primary Examiner—Steven P. Griffin
Assistant Examiner—Eileen E. Nave

[57] ABSTRACT

The present invention is a process wherein bleaching oxidants are used to digest explosive nitro compounds. The process has an excellent reaction rate for digesting explosives and operates under multivariate conditions. Reaction solutions may be aqueous, non-aqueous or a combination thereof, and can also be any pH, but preferably have a pH between 2 and 9. The temperature may be ambient as well as any temperature above which freezing of the solution would occur and below which any degradation of the bleaching oxidant would occur or below which any explosive reaction would be initiated. The pressure may be any pressure, but is preferably ambient or atmospheric, or a pressure above a vapor pressure of the aqueous solution to avoid boiling of the solution. Because the bleaching oxidant molecules are small, much smaller than an enzyme molecule for example, they can penetrate the microstructure of plastic explosives faster. The bleaching oxidants generate reactive hydroxyl radicals, which can destroy other organic contaminants, if necessary, along with digesting the explosive nitro compound.

4 Claims, 2 Drawing Sheets

METHOD OF DIGESTING AN EXPLOSIVE NITRO COMPOUND

This invention was made with Government support under Contract DE-AC0676RLO1830 awarded by the U.S. Department of Energy. The Government has certain rights in the invention.

FIELD OF THE INVENTION

The present invention is a method for digesting explosive nitro compounds into a plurality of subcompounds that are not explosive.

BACKGROUND OF THE INVENTION

Methods for digesting nitro compounds have received interest as the products from the partial or total digestion of those nitro compounds have found an expanding variety of uses. These uses include drug intermediates, antibiotics, pesticides, herbicides, radiosensitizers and explosives which may be produced with nitros as starting materials. As used in these applications, the nitro compounds are partially or totally digested as part of the processing required for production of the final product.

Additionally, nitro compounds in many circumstances have been proven to create environmental or health hazards. For example, nitrobenzene has been shown to cause headaches, drowsiness, nausea, vomiting and methemoglobinemia with cyanosis. Nitrobenzene has also been shown to be toxic to rats with LD50 of 640 mg/kg.

Disposal of excess, aging, or unstable munitions (explosive nitro compounds) stockpiled around the world has been handled in various ways including openly burning/openly detonating (OB/OD) them, land burial, open sea disposal, and limited conversion or sale for use by the mining industry. However, most of these past practices are now unacceptable because of stringent environmental regulations. Specifically, OB/OD produces airborne particulates and pollutants and releases toxic compounds. Burial that is not sealed also releases toxic compounds into soil and groundwater. Additionally, the conversion of explosive nitro compounds from military explosives into mining-grade explosives is expensive and only removes a small percentage of a nation's stockpile from its inventory. Regulators allow incineration on a case-by-case basis with limits on how much can be burned. Thus, incineration is not a viable option for disposing of the currently large amount of explosive nitro compounds in the prevailing regulatory environment and is likewise viewed by the public as an unfriendly process.

The current stockpile of explosive nitro compounds requiring resource recovery or disposition (RRD) is 449,308 tons. Through 2001, over 1.2 million tons will pass through or reside in the RRD account (Joint Ordnance Commands Group; 1995). A totally different but significantly similar challenge exists in clean-up of the sites where soil and ground water are contaminated with TNT, RDX, HMX, and other explosive nitro compounds. Hence, there is a need for characterizing the reactions of explosive nitro compounds with naturally occurring enzymes, as well as a need for cost-effective technologies to degrade these explosive nitro compounds by simple and safe processes.

Such technologies include molten salt processes and supercritical water oxidation (SCWO). Molten salt is a high temperature process described in the U.S. Pat. No. 5,398,914 MOLTEN SALT PROCESS VESSEL. Supercritical water oxidation uses oxygen in water at a temperature and pressure above its critical point as described in U.S. Pat. No. 5,133,877 CONVERSION OF HAZARDOUS MATERIALS USING SUPERCRITICAL WATER OXIDATION. Disadvantages of large scale (demilitarization) and small scale (local explosive threat) deployment of both the molten salt and supercritical water oxidation include high energy cost, complexity of deployment, lack of mobility and reduced operational safety.

A process known as base hydrolysis has also been shown to render many explosive nitro compounds non-explosive via reaction with sodium hydroxide or ammonia. Base hydrolysis is another high temperature process described in the paper by Raymond L. Flesner et al., PILOT-SCALE BASE HYDROLYSIS PROCESSING OF HMX-BASED PLASTIC-BONDED EXPLOSIVES, $_4$th International Symposium On Special Topics In Chemical Propulsion: Challenges In Propellants And 100 Years After Nobel, May 27–31, 1996. Disadvantages of base hydrolysis include the need for expensive pressurized reactors to carry out the process at temperatures above the normal solution boiling point.

To take advantage of the potential uses of partially and totally digested explosive nitro compounds and to eliminate these compounds in circumstances where they pose environmental or health risks, a variety of processing schemes have been developed to bring about the partial or total digestion of these explosive nitro compounds. Many such schemes involve the use of naturally occurring enzymes to catalyze the digestion process. Such schemes are highly advantageous as the enzymes are often readily obtainable and their use as catalysts minimizes undesirable waste and byproducts. An example of the use of such enzymes is provided by Sommerville (Sommerville, C., Nishino, S.F., and Spain, J.C. (1995) J. Bacteriol., 177, 3837–3842), wherein it is demonstrated that digestion of nitrobenzene may result in phenylhydroxylamine as a byproduct through the use of oxygen insensitive nitrobenzene reductase as a catalyst. Schemes such as that described in Sommerville are characterized by an inability to control the digestion using a simple inhibitor such as molecular oxygen, as well as requirements to use an expensive digestive agent, NADPH. However, it is often desirable that the digestion of the explosive nitro compounds not be allowed to progress to completion such that partially digested products may be isolated and/or collected.

U.S. Pat. No. 5,777,190 to Shah et al., is directed to a method for the controlled digestion of explosive nitro compounds such as nitrobenzene and 2,4,6-trinitrotoluene (TNT) by enzymatic reaction with oxygen sensitive nitroreductase enzymes, such as ferredoxin NADP oxidoreductase. Through the addition of oxygen, the digestion of explosive nitro compounds may be halted at the point at which a partially digested product has been produced. Again, a disadvantage of this and prior processes is the relative unavailability and cost of expensive cofactors like nicotinamide adenine dinucleotide phosphate (NADPH) used for digesting the explosive nitro compounds.

Hence, there remains a need for a simple, safe, and cost-effective method to digest explosive nitro compounds using readily available digestive agents.

SUMMARY OF THE INVENTION

Accordingly, it is an object of the present invention to provide a readily available digestive agent which provides a simple, safe and inexpensive method for digesting explosive nitro compounds.

The present invention is a process wherein bleaching oxidants are used to break down the explosive nitro compounds into non-explosive compound(s), for example non-explosive organic compounds, salt water and combinations thereof. The process has an excellent reaction rate for digesting explosives, and preferably operates at ambient temperature and atmospheric pressure in aqueous conditions. Because the bleaching oxidant molecules are small, much smaller than an enzyme molecule for example, they can penetrate the microstructure of plastic explosives faster. This is advantageous when dealing with an explosive that cannot be physically manipulated safely, such as a terrorist bomb. The bleaching oxidant generates reactive hydroxyl radicals which can destroy other organic contaminants if necessary, along with digesting the explosive nitro compound. The bleaching oxidant is much less expensive than competing munition destruction methods.

It is advantageous that the process of the present invention releases no air pollutants and meets the regulations of the Clean Air Act, the Resource Conservation and Recovery Act (RCRA), and the Federal Facilities Compliance Act (FFCA).

It is an object of the present invention to provide a method for digesting explosive nitro compound(s) with a bleaching oxidant.

The present invention is a method of digesting explosive nitro compounds, and includes the step of exposing the explosive nitro compound to a solution having a solvent and a bleaching oxidant, thereby digesting the explosive nitro compound to non-explosive organics into the solution.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT(S)

Figure 1:
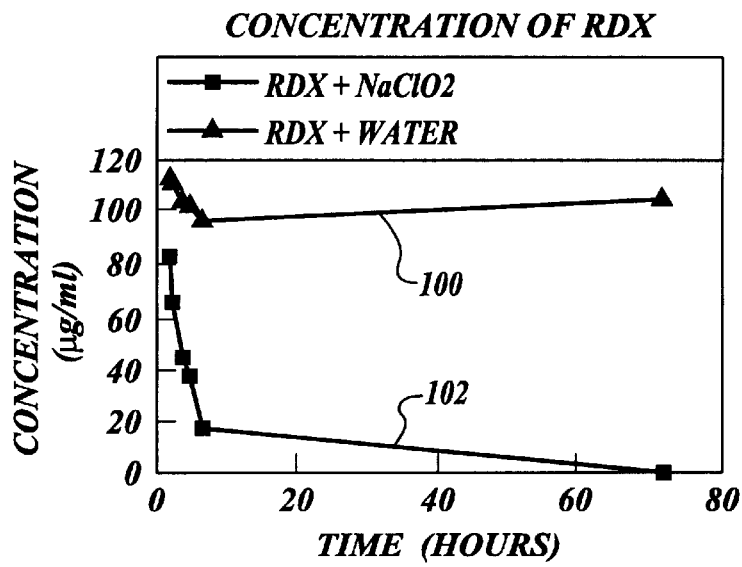
FIG. 1 is a plot of RDX concentrations over time in an experimental control mixture and a $NaClO_2$ reaction mixture.

The present invention is a process wherein an explosive nitro compound is contacted with a solution prepared as a solvent and a bleaching oxidant. The solution can be any pH, but preferably has a pH between 2 and 9. The solvent may be aqueous, non-aqueous or a combination thereof. Non-aqueous solvents include but are not limited to dimethyl-sulfoxide (DMSO), hexane, toluene, alcohol and combinations thereof.

The temperature is preferably ambient or room temperature, but may be any temperature above which freezing of the solution would occur and below which any degradation of the bleaching oxidant would occur or below which any explosive reaction would be initiated. The pressure may be any pressure, but is preferably ambient or atmospheric pressure, or a pressure above a vapor pressure of the aqueous solution to avoid boiling of the solution. In some cases, however, boiling may be desirable to promote mixing.

The bleaching oxidant is preferably sodium chlorite ($NaClO_2$), but may be any of a group of halogen related chemicals. Examples of the halogen related chemicals include but are not limited to calcium hypochlorite, sodium hypochlorite, chlorine dioxide, hypochlorous acid, sodium chlorite, sodium peroxide, sodium sulfite, sodium bisulphite, chlorine gas ($Cl_2$), bromine gas ($Br_2$), flourine gas ($F_2$), bromite, and ozone.

Explosive nitro compounds include but are not limited to RDX ($C_3H_6N_6O_6$), HMX ($C_4H_8N_8O_8$), TNT ($C_7H_5N_3O_6$), PETN ($C_5H_8N_4O_{12}$), and combinations thereof. Any of the aforementioned explosive nitro compounds may also be combined with nitrobenzene, which is also reacted with the bleaching oxidant.

A preferred solution is one having a combination of non-aqueous solvent and water with the bleaching oxidant. The bleaching oxidant is preferably, but not necessarily, mixed until dissolved in solution. Dissolving the bleaching oxidant in solution increases the rate of reduction of the nitro compound. The nitro compound is also preferably, but not necessarily, mixed until dissolved in solution, which permits better chemical contact with the bleaching oxidant.

EXPERIMENT 1

An experiment was conducted to demonstrate the efficacy of a preferred embodiment of the present invention. The purpose of the experiment was to monitor the digestion of the explosive nitro compound, hexahydro-1,3,5-trinitro-1,3,5-triazine (RDX), using sodium chlorite ($NaClO_2$) as a digestive agent.

An experimental control mixture was prepared by adding together 100 μl of RDX and 900 μl MilliQ water in a vial. A $NaClO_2$ reaction mixture was prepared by adding together 100 μl of RDX, 900 μl MilliQ water, and 100 mg of $NaClO_2$ in a vial. The vials were shaken vigorously to dissolve the $NaClO_2$. The RDX was also dissolved in the mixture.

The mixtures were incubated at room temperature and the area of RDX peak from chromatograms was monitored at the time intervals shown in the following table:

RESULTS TABLE I

Area of RDX peak from the chromatograms of the experimental control mixture and $NaClO_2$ reaction mixture over time
Area of RDX Peak (Retention Time:4.9 minutes)

| Time(hours) | RDX + Water (Control Mixture) | RDX + Water + $NaClO_2$ (Reaction Mixture) |
| --- | --- | --- |
| 2 | 2127.23 | 1575.04 |
| 2.5 |  | 1242.15 |
| 4 | 1953.57 | 840.08 |
| 5 | 1912.14 | 681.21 |
| 6.5 | 1818.22 | 312.96 |
| 72 | 1984.20 | 0.0 |

The concentrations of RDX in the mixtures were analyzed by running the mixtures on a high performance liquid chromatography (HPLC) with a diode array detector (HP 1090, Hewlett-Packard, Palo Alto, Calif.). The retention times and absorbence levels of RDX were compared between the control mixture and the reaction mixture. A reversed phase HPLC column (ODS Ultraspere, 5 micron) with dimensions of 4.6 mm ID×25 cm was used for separation. Methanol and water were used as the mobile phase at a ratio of 50:50 with a flow rate of 1 mil/min. The absorbance of eluents of the column was monitored at 230 nm.

The chromatograms confirmed that the RDX peak (retention time=4.9 minutes) decreased over time when in a solution of $NaClO_2$. FIG. 1 shows the concentration of RDX in both the control mixture 100 and the reaction mixture 102 over a period of three days. The concentrations of RDX in the reaction mixture 102 and the control mixture 100 shown in FIG. 1, show that the explosive nitro compound, RDX, is digested by the $NaClO_2$. RDX is oxidized to organics in non-explosive form and sodium chlorite is converted to NaCl, salt water.

EXPERIMENT 2

A second experiment was conducted to demonstrate the efficacy of a second preferred embodiment of the present invention. The purpose of the experiment was to monitor the digestion of the explosive nitro compound, hexahydro-1,3,5-trinitro-1,3,5-triazine (RDX), using varying amounts of sodium chlorite ($NaClO_2$) as a digestive agent.

An experimental control mixture was prepared by adding together 100 µl of RDX and 900 µl MilliQ water in a vial. Five $NaClO_2$ reaction mixtures were prepared by adding together 100 µl of RDX, 900 µl MilliQ water, and 100, 50, 25, 12.5 and 6.25 mg of $NaClO_2$ respectively in vials. The vials were shaken vigorously to dissolve the $NaClO_2$. The RDX was also dissolved in the mixture.

The mixtures were incubated at room temperature and the area of RDX peak from chromatograms was monitored at the time intervals shown in the following table:

RESULTS TABLE II

Area of RDX peak from the chromatograms of the experimental control mixture and $NaClO_2$ reaction mixtures over time
Area of RDX Peak with Varying Amounts of $NaClO_2$
(Retention Time: 4.9 minutes)

| Time (hours) | RDX + Water (Control Mixture) | RDX + Water + $NaClO_2$ (Reaction Mixtures) | | | | |
| --- | --- | --- | --- | --- | --- | --- |
| | | 100 mg $NaClO_2$ | 50 mg $NaClO_2$ | 25 mg $NaClO_2$ | 12.5 mg $NaClO_2$ | 6.25 mg $NaClO_2$ |
| 1.5 | 2289.86 | 1359.9 | 1561.37 | 1806.55 | 2018.49 | 2208.12 |
| 3 | 2119.18 | 747.16 | 1351.64 | 1720.39 | 2067.22 | 2027.82 |
| 5.5 | 1970.44 | 330.99 | 934.09 | 1286.78 | 1546.79 | 1839.38 |
| 24 | 2629.98 | 0.0 | 0.0 | 0.0 | 0.0 | 1109.62 |

Figure 2:
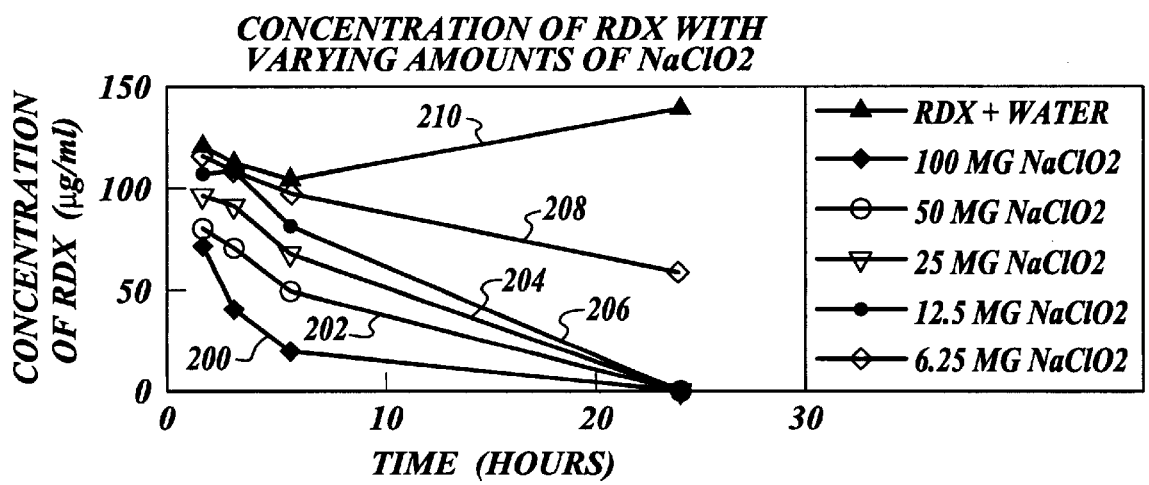
FIG. 2 is a plot of RDX concentrations over time in an experimental control mixture and $NaClO_2$ reaction mixtures, where the $NaClO_2$ reaction mixtures contain varying concentrations of $NaClO_2$.
Figure 3:
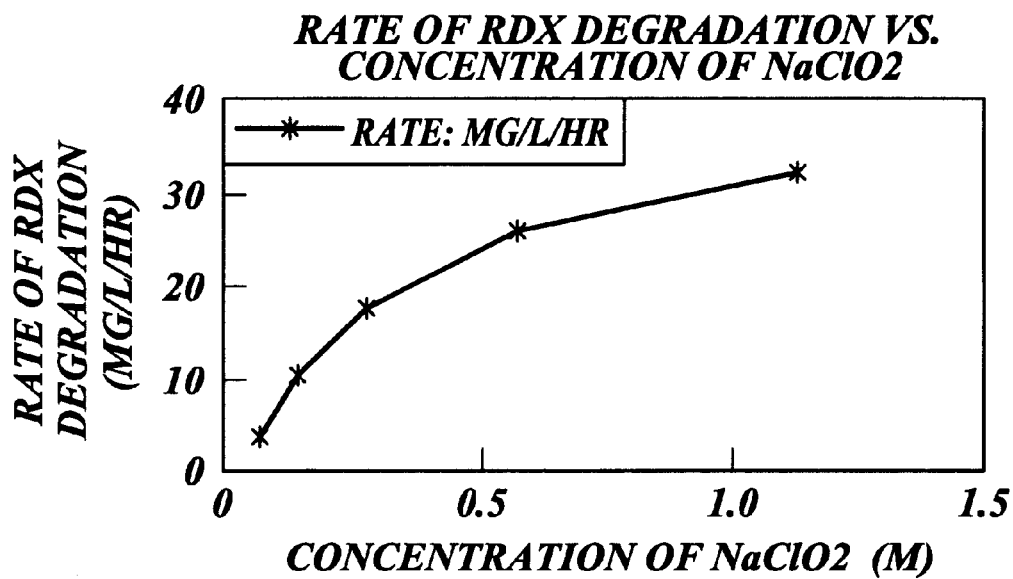
FIG. 3 is a plot of the rate of RDX degradation versus concentration of $NaClO_2$.

The concentrations of RDX in the mixtures were analyzed by running the mixtures on HPLC as described above in EXPERIMENT 1. The chromatograms confirmed that the RDX peaks decreased at a faster rate with increasing concentrations of $NaClO_2$. FIG. 2 shows that the concentration of RDX decreased over time when it was reacted with varying amounts of $NaClO_2$ (100 mg 200, 50 mg 202, 25 mg 204, 12.5 mg 206, 6.25 mg 208), whereas the RDX+water control mixture 210 did not show the same digestion activity. FIG. 3 shows that the rate of RDX digestion increased with increasing concentrations of $NaClO_2$.

EXPERIMENT 3

A third experiment was conducted to demonstrate the efficacy of a third preferred embodiment of the present invention. The purpose of the experiment was to determine the kinetics of the explosive nitro compound, octahydro-1,3,5,7-tetranitro-1,3,5,7-tetrazocine (HMX), by sodium chlorite ($NaClO_2$) after incubation at 70° C.

An experimental control mixture was prepared by adding together 200 µl of HMX and 800 µl MilliQ water in a vial. A $NaClO_2$ reaction mixture was prepared by adding together 200 µl of HMX, 800 µl MilliQ water, and 100 mg of $NaClO_2$ in a vial. Both mixtures were run on HPLC as described above in EXPERIMENT 1 for time zero, and then incubated at 70° C.

Mixture samples were run on HPLC after one hour, and then every two hours thereafter seven hours as shown in the following table:

RESULTS TABLE III

Area of HMX peak from the chromatograms of the experimental control mixture and $NaClO_2$ reaction mixture over time
Area of HMX Peak (Retention Time:3.61 minutes)

| Time(hours) | HMX + Water (Control Mixture) | HMX + Water + $NaClO_2$ (Reaction Mixture) |
| --- | --- | --- |
| 0 | 2072.70068 | 2064.37451 |
| 1 | 2050.01196 | 165.86166 |
| 3 | 1993.21179 | 56.82795 |
| 5 | 1910.24866 | 0.0 |
| 7 | 1870.43994 | 0.0 |

Figure 4:
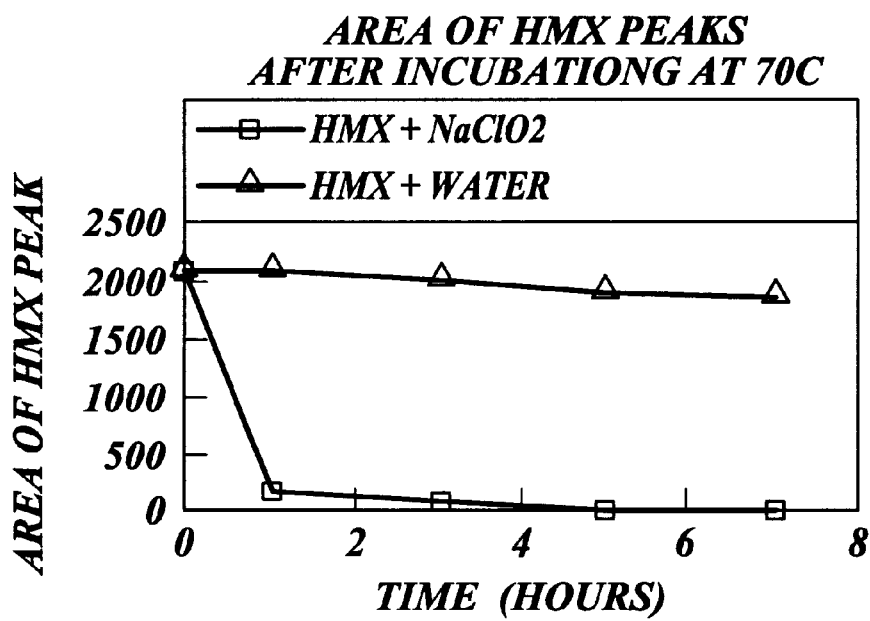
FIG. 4 is a plot of the area of HMX peak over time in a control mixture and a $NaClO_2$ reaction mixture.

The chromatograms confirmed that the HMX peak (retention time=3.61 minutes) decreased over time in the $NaClO_2$ reaction mixture. FIG. 4 shows the decrease in the area of HMX peak in both the $NaClO_2$ reaction mixture 400 and the control mixture 402, and indicates the digestion activity in the $NaClO_2$ reaction mixture 400 was not present in the control mixture 402.

This process can also be further characterized by varying the concentration of $NaClO_2$.

CLOSURE

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A method for digesting an explosive nitro compound into a non-explosive compound comprising the steps of:

(a) preparing a solution containing a solvent and a bleaching solution oxidant selected from the group consisting of calcium hypochlorite, sodium hypochlorite, chlorine dioxide, hypochlorous acid, sodium chlorite, sodium peroxide, chlorine gas ($Cl_2$), bromine gas ($Br_2$), fluorine gas ($F_2$), and bromite; and (b) contacting the explosive nitro compound with said solution and digesting the explosive nitro compound into the non-explosive compound.

2. The method as recited in claim 1, wherein the solvent is selected from the group consisting of non-aqueous solvent, aqueous solvent and combinations thereof.

3. The method as recited in claim 1, wherein the explosive nitro compound is selected from the group consisting of hexahydro-1,3,5-trinitro-1,3,5-triazine ($C_3H_6N_6O_6$) (RDX), octahydro-1,3,5,7-tetranitro-1,3,5,7-tetrazocine ($C_4H_8N_8O_8$) (HMX), 2,4,6-trinitrotoluene ($C_7H_5N_3O_6$) (TNT), PETN ($C_5H_8N_4O_{12}$), nitrobenzene, and combinations thereof.

4. A method for disposing of an explosive nitro compound comprising the step of contacting the explosive nitro compound with a bleaching oxidant selected from the group consisting of calcium hypochlorite, sodium hypochlorite, chlorine dioxide, hypochlorous acid, sodium chlorite, sodium peroxide, chlorine gas ($Cl_2$), bromine gas ($Br_2$), fluorine gas ($F_2$), and bromite in an aqueous solution containing an organic solvent and digesting the explosive nitro compound into non-explosive organics and salt water.

* * * * *